UNITED STATES PATENT OFFICE.

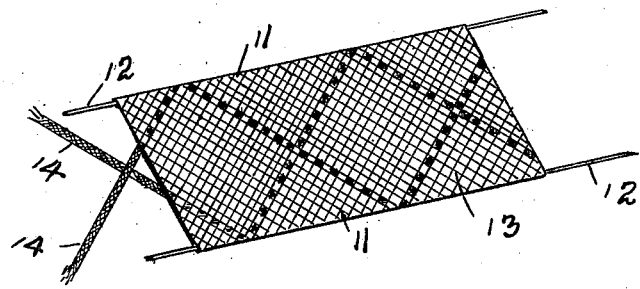
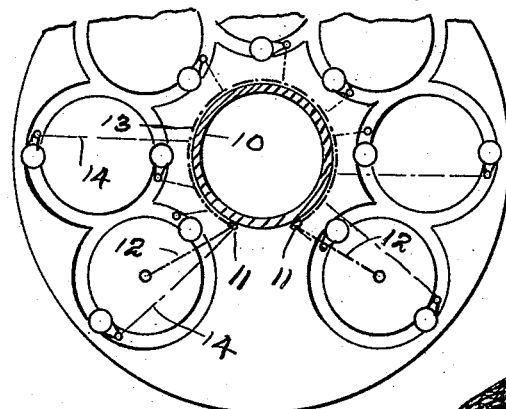
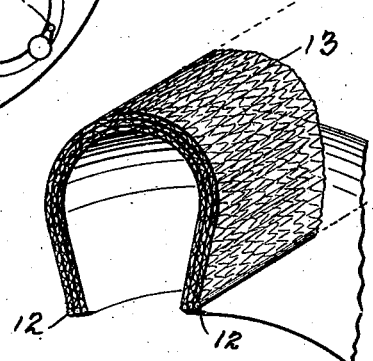
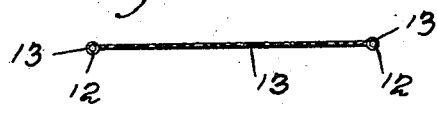
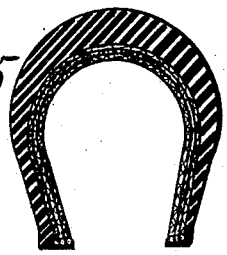
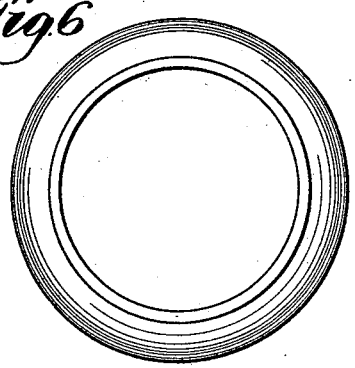

JOHN P. KING, OF PROVIDENCE, RHODE ISLAND, ASSIGNOR OF ONE-HALF TO LEON E. DANFORTH, OF PROVIDENCE, RHODE ISLAND.

METHOD OF FORMING TIRE CASINGS.

1,407,159.        Specification of Letters Patent.    Patented Feb. 21, 1922.

Application filed May 29, 1919. Serial No. 300,539.

*To all whom it may concern:*

Be it known that I, JOHN P. KING, a citizen of the United States, and resident of the city of Providence, in the county of Providence and State of Rhode Island, have invented certain new and useful Improvements in Methods of Forming Tire Casings, of which the following is a specification.

This invention relates to improvements in tire casings and method of forming the same, and has for its object to provide a tire casing more particularly adapted for use on automobiles, the same being constructed by providing a braided fabric of the required width and applying this fabric in a plurality of circumferentially disposed layers about the casing by stretching that portion of the fabric intermediate its edges to conform to the contour of the casing.

A further object of the invention is to employ a braided fabric in the construction of tire casings, the same being formed of threads or strands which have themselves been previously braided.

It is well known by those skilled in the art that a braided thread possesses a greatly increased percentage of strength over that of the ordinary twisted thread; also that a braided fabric has a much greater strength than a woven fabric, weight for weight.

My improved braided fabric formed of braided threads is particularly well adapted for use in the construction of a tire casing owing to the fact that it contains the maximum strength and other required qualifications that can possibly be obtained in a fabric of equal weight.

With these and other objects in view, the invention consists of certain novel features of construction, as will be more fully described, and particularly pointed out in the appended claims.

In the accompanying drawings:

Figure 1—is a face view showing a short section of my improved braided fabric; also illustrating a pair of the threads or strands of which the fabric is formed as being themselves braided.

Figure 2—is a plan view illustrating one means by which the fabric may be braided into substantially the form in cross-section it is to assume upon being applied to a tire casing.

Figure 3—is an edge view of the fabric in flat form, showing the strengthening, reenforcing threads braided into the selvage edges of the fabric.

Figure 4—illustrates a strip of fabric as being applied to a tire casing.

Figure 5—is a sectional elevation of a finished tire casing.

Figure 6—is a side elevation of the finished tire casing.

By my improved method I first braid a fabric on a specially constructed braiding machine one form of which is illustrated in Figure 2 and which may be provided with a former 10 substantially circular or in the shape of a tire casing in cross section; and the fabric 13 as braided onto this former is exactly the required width to extend about and conform to the surface of the casing in cross section. The edges of the fabric being formed with a selvage, the threads of which are doubled upon themselves, provide increased strength and also provide edges which will not ravel.

In order to stiffen and again greatly strengthen these selvage edges I may if desired insert a thread or strand 12 which may be of cord, wire or other suitable material, into these selvage edges, which strengthening threads serve to provide the necessary tensile strength for the bead or inner edge of the tire; and also serve to take the strain when tightening the fabric about the surface of the casing.

To greatly increase the tensile strength of this specially constructed, braided fabric, I preferably first braid the threads or strands 14 of which the fabric is constructed thereby greatly increasing the strength and wearing quality of this fabric over a fabric formed of unbraided threads. Then again in order to obtain a very closely braided fabric I employ a special mechanism for beating up each layer of threads as laid thereby again increasing the strength per square inch of the fabric.

Inasmuch as the threads of this braided fabric lie diagonally relative to the edge of the fabric, this fabric after having been impregnated with the usual rubber compound and while still hot may be wound directly in a spiral form about the circumference of the casing for the purpose of building up the same, the selvage edges of the braided strip serving to form the bead of the tire and owing to the diagonal disposition of the threads those intermediate the edges will automatically adjust themselves and permit the fabric to stretch or accommodate itself to the contour of the casing both circularly in transverse section and circumferentially.

After the requisite number of plies or layers of the fabric have been positioned to construct the casing the usual covering layer or tread portion of rubber is applied and when the whole becomes cool and hardened the threads of the fabric are securely locked against further relative movement. As the strength and the wearing quality of the tire are largely dependent upon the strength and resisting qualities of the fabric of which it is made, it will be seen that my braided fabric has a number of important advantages over one made of a woven fabric; first, it possesses a much greater strength over the ordinary fabric of similar weight; second, owing to the fact that this fabric is braided into the exact shape and size to be naturally wound in a spiral form about the casing in building up the same it will naturally lie and conform to the surface both circularly in cross section, and circumferentially of the tire and fit like a glove, thereby greatly reducing the expense in the construction of the tire; and third, as the fabric is provided with selvage edges these edges which form the bead of the tire are naturally of very great strength where increased strength is required.

I do not wish to be limited to braiding this fabric on a circular former as the fabric may be braided in any desired shape.

Having thus described one illustrative embodiment of my invention and the best mode known to me for carrying out my method, I desire it to be understood that although specific terms are employed, they are used in a generic and descriptive sense and not for purposes of limitation, the scope of the invention being defined and limited only by the terms of the appended claims.

I claim:

1. A method of forming a tire casing, which consists in first braiding a thread or strand forming a braided fabric of said braided threads or strands and applying the fabric so formed in layers about the casing by stretching that portion of the fabric intermediate its edges to conform to the contour of the casing.

2. A method of forming a tire casing, which consists in first forming a braided fabric with a thread or strand of greater strength than that of the rest of the fabric, braided into its selvage edges and applying this fabric in layers about the casing by stretching that portion of the fabric intermediate its selvage edges to conform to the contour of the casing, said strengthened edges forming the bead portion of the casing.

3. A method of forming a tire casing, which consists in forming a braided thread or strand forming a braided fabric of said braided threads or strands forming a thread or strand in each selvage edge of a strength greater than that of the rest of the fabric, and applying this fabric in layers about the casing by stretching that portion of the fabric intermediate said selvage edges while being applied thereto causing the same to conform to the contour of the casing, said strengthened edges being located at the bead of the casing.

In testimony whereof I affix my signature.

JOHN P. KING.